United States Patent
Lee et al.

(10) Patent No.: US 7,535,482 B2
(45) Date of Patent: May 19, 2009

(54) DEVICE FOR ADAPTIVELY ADJUSTING VIDEO LUMINANCE AND RELATED METHOD

(75) Inventors: Wei-Kuo Lee, Hsin-Chu Hsien (TW); Her-Ming Jong, Hsin-Chu (TW); An-Chen Teng, Hsin-Chu (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 722 days.

(21) Appl. No.: 10/906,892

(22) Filed: Mar. 11, 2005

(65) Prior Publication Data

US 2005/0212825 A1 Sep. 29, 2005

Related U.S. Application Data

(60) Provisional application No. 60/551,801, filed on Mar. 11, 2004.

(51) Int. Cl.
G09G 3/30 (2006.01)
G09G 3/36 (2006.01)
G06F 3/038 (2006.01)
G09G 5/10 (2006.01)

(52) U.S. Cl. ............... 345/690; 345/204; 345/77; 345/89; 345/102

(58) Field of Classification Search ............ 345/204, 345/690, 77, 89, 102
See application file for complete search history.

(56) References Cited

U.S. PATENT DOCUMENTS

| | | | | |
|---|---|---|---|---|
| 5,982,379 | A * | 11/1999 | Suzuki et al. | 345/593 |
| 6,313,814 | B1 | 11/2001 | Arimoto et al. | |
| 6,552,736 | B2 * | 4/2003 | Honda et al. | 345/691 |
| 6,972,771 | B2 * | 12/2005 | Nakano et al. | 345/589 |
| 7,191,402 | B2 | 3/2007 | Kim et al. | |
| 7,209,103 | B2 * | 4/2007 | Maeda et al. | 345/87 |
| 7,268,753 | B2 * | 9/2007 | Lee et al. | 345/77 |
| 2004/0189626 | A1 | 9/2004 | Mori | |

FOREIGN PATENT DOCUMENTS

| | | |
|---|---|---|
| KR | 20030084198 | 11/2003 |
| TW | 414907 | 12/2000 |
| TW | 546626 | 8/2003 |

* cited by examiner

*Primary Examiner*—Sumati Lefkowitz
*Assistant Examiner*—Alexander S Beck
(74) *Attorney, Agent, or Firm*—Winston Hsu

(57) ABSTRACT

A device includes a plurality of luminance adjustment tables, a luminance analysis unit for analyzing a luminance distribution of a plurality of pixels of a source video, and a dynamic luminance curve fitting unit electrically connected to the luminance analysis unit and the luminance adjustment tables for adjusting luminance levels of the pixels of the video based on one of the luminance adjustment tables selected according to the luminance distribution.

16 Claims, 10 Drawing Sheets

DEVICE FOR ADAPTIVELY ADJUSTING VIDEO LUMINANCE AND RELATED METHOD

CROSS REFERENCE TO RELATED APPLICATIONS

This is a non-provisional application of U.S. provisional application No. 60/551,801, which was filed on Mar. 11, 2004 and is included herein by reference.

BACKGROUND OF INVENTION

1. Field of the Invention

The present invention relates to a device for adjusting video luminance level and related method, and more particularly, to a device for adaptively adjusting video luminance level and related method.

2. Description of the Prior Art

FIG. 1 is a schematic diagram of a video display device 10 according to the prior art. The video display device 10 comprises a housing 12, a display 14, and a plurality of control knobs 16 installed on the housing 12, such as a luminance control knob 16. A user of the video display device 10 may adjust the luminance level of a video 18 displayed on the display 14 by rotating the luminance knob 16.

However, since the luminance level of the video 18 displayed on the display 18 is to be adjusted passively, the user, when they perceive that the video 18 is too bright or too dark, has to rotate the luminance knob 16 accordingly to improve the video's 18 quality.

Moreover, the luminance knob 16 can do nothing but increase, or decrease the luminance level of the video 18 as a whole. In result, the luminance adjusting process performed by the luminance knob 16 on the video 18 does not improve the contrast of the video 18.

SUMMARY OF INVENTION

It is therefore a primary objective of the claimed invention to provide a device and related method for adaptively adjusting luminance of a video, so as to overcome the above-mentioned problems.

According to the claimed invention, the device includes a plurality of luminance adjustment tables, a luminance analysis unit for analyzing a luminance distribution of a plurality of pixels of a source video, and a dynamic luminance curve fitting unit electrically connected to the luminance analysis unit and the luminance adjustment tables for adjusting luminance levels of the pixels of the source video based on one of the luminance adjustment tables selected according to the luminance distribution. The dynamic luminance curve fitting unit is preferably to have a current luminance table. The dynamic luminance curve fitting unit updates the current luminance table according to the selected luminance adjustment table, and adjusts the luminance of the source video based on the updated current luminance table.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
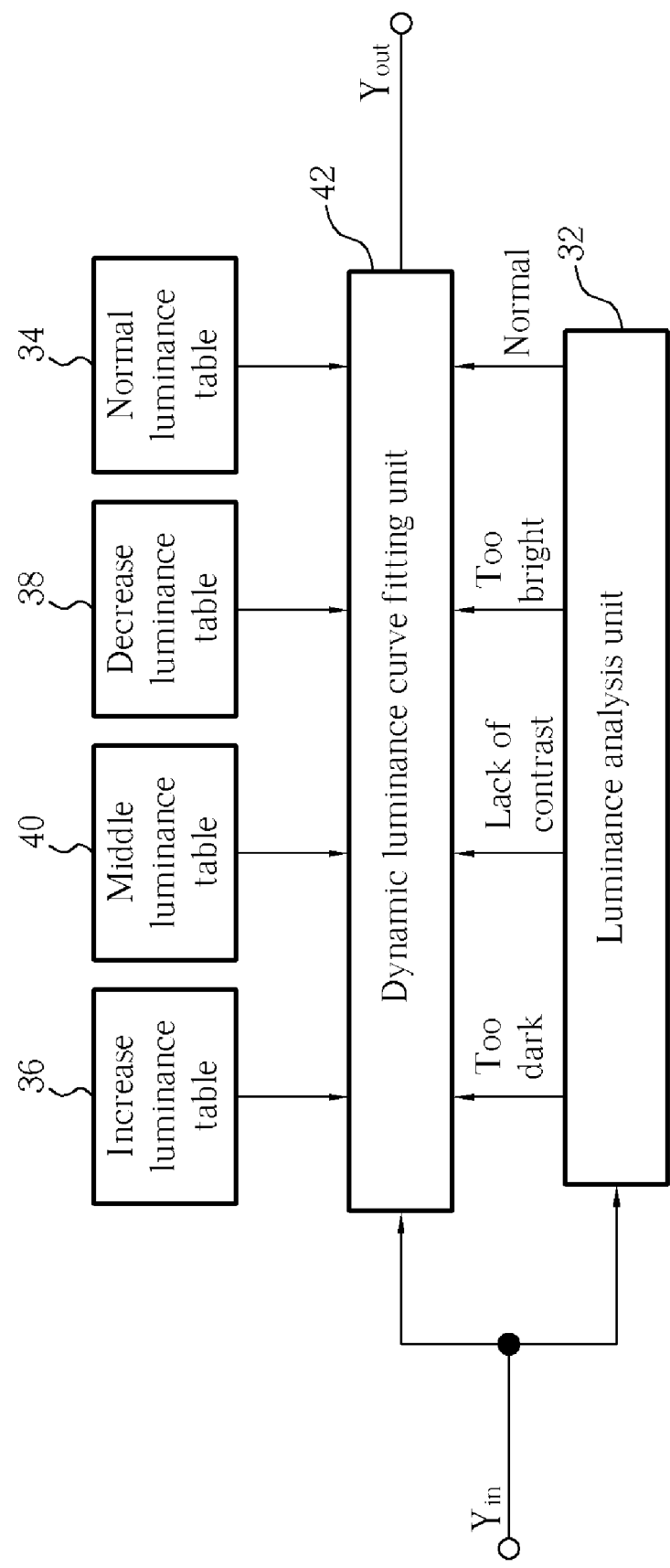
FIG. 2 is a functional block diagram of a luminance adjustment device of the preferred embodiment according to the present invention.

FIG. 2 is a functional block diagram of a luminance adjustment device of the preferred embodiment according to the present invention. The luminance adjustment device is capable of adaptively adjusting luminance levels of a plurality of pixels of the video 18. The luminance adjustment device comprises a luminance analysis unit 32, a normal luminance table 34, an increase luminance table 36, a decrease luminance table 38, a middle luminance table 40, and a dynamic luminance curve fitting unit 42. The luminance analysis unit 32 analyzes the luminance distribution of luminance levels of pixels of the video 18. The dynamic luminance curve fitting unit 42 selects one of the above four luminance adjustment tables according to the luminance distribution output by the luminance analysis unit 32 to curve-fit the luminance levels of the pixels of the video 18. Thus, the output luminance levels $Y_{out}$ of adjusted pixels of the video 18 is generated.

FIG. 3 to FIG. 6 are four exemplary luminance adjustment function curves, a normal luminance function $F_N$, an increase luminance function $F_D$, a decrease luminance function $F_L$, and a middle luminance function $F_M$, corresponding to the normal luminance table 34, the increase luminance table 36, the decrease luminance table 38, and the middle luminance table 40 respectively, where the abscissa represents the input luminance levels $Y_{in}$ of the pixels of the video 18, and the ordinate represents the output luminance levels $Y_{out}$ of the adjusted pixels of the video 18.

Figure 3:
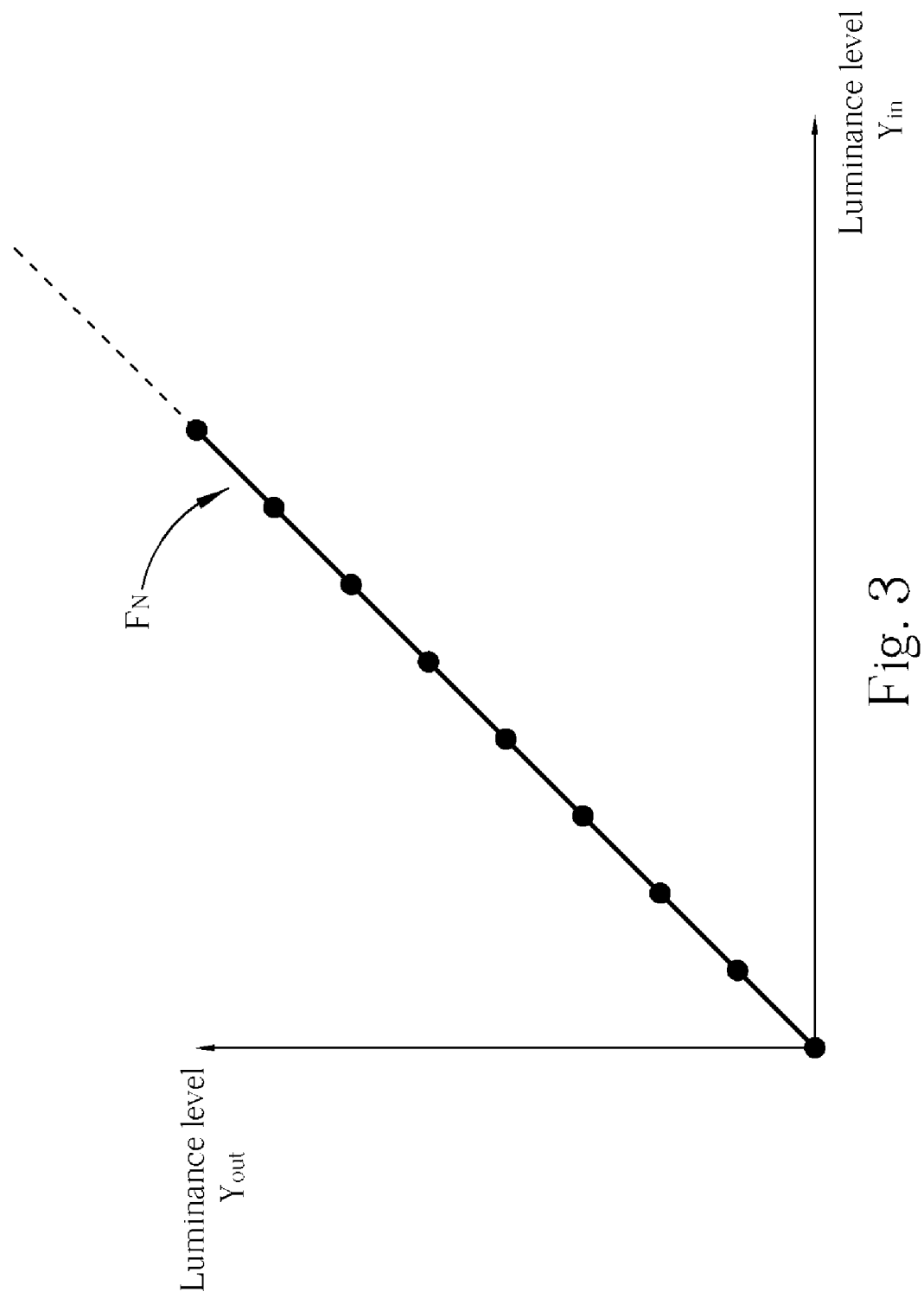
FIG. 3 to FIG. 6 shows four function curves corresponding to four luminance adjustment mapping tables.
Figure 4:
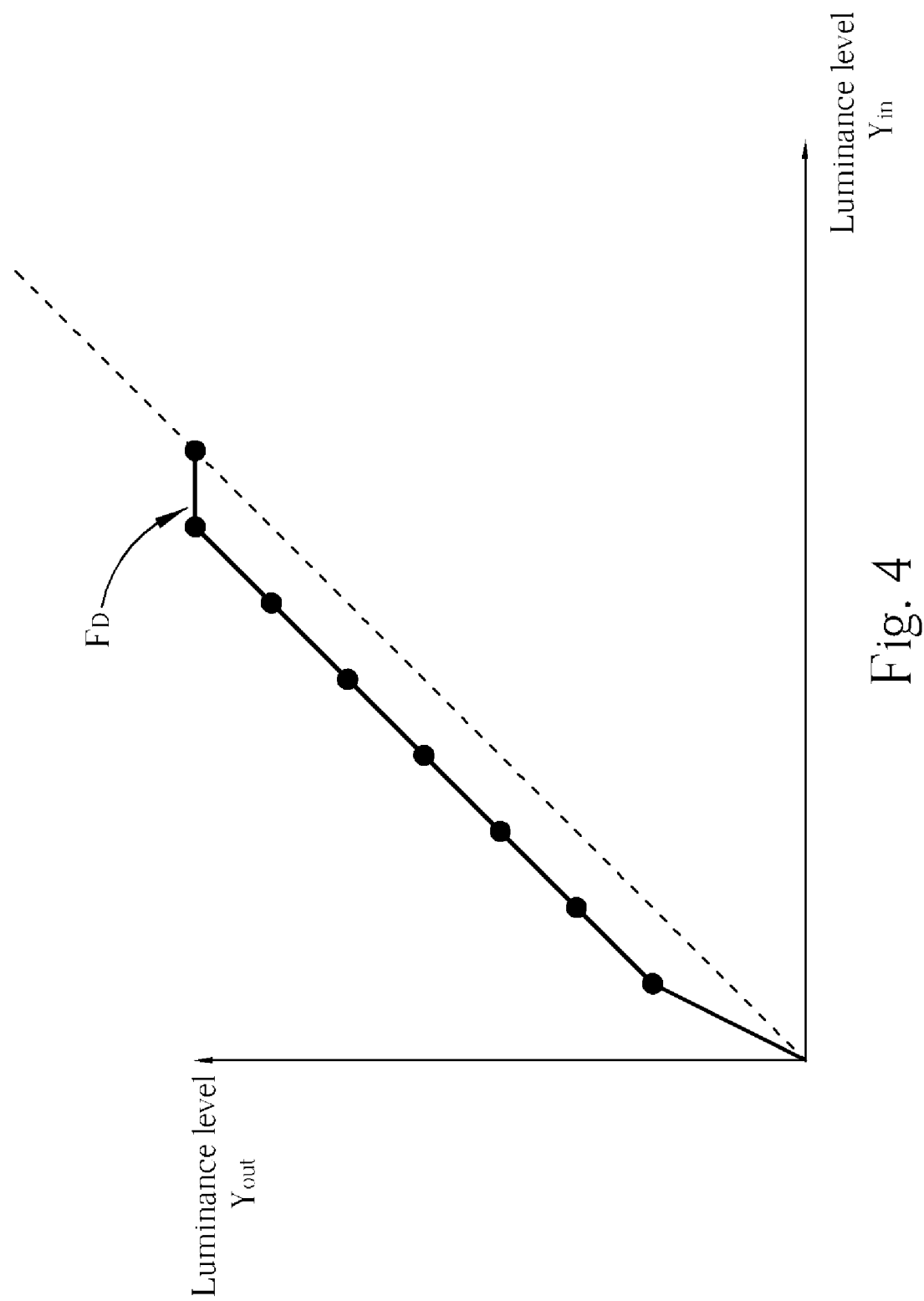
Figure 5:
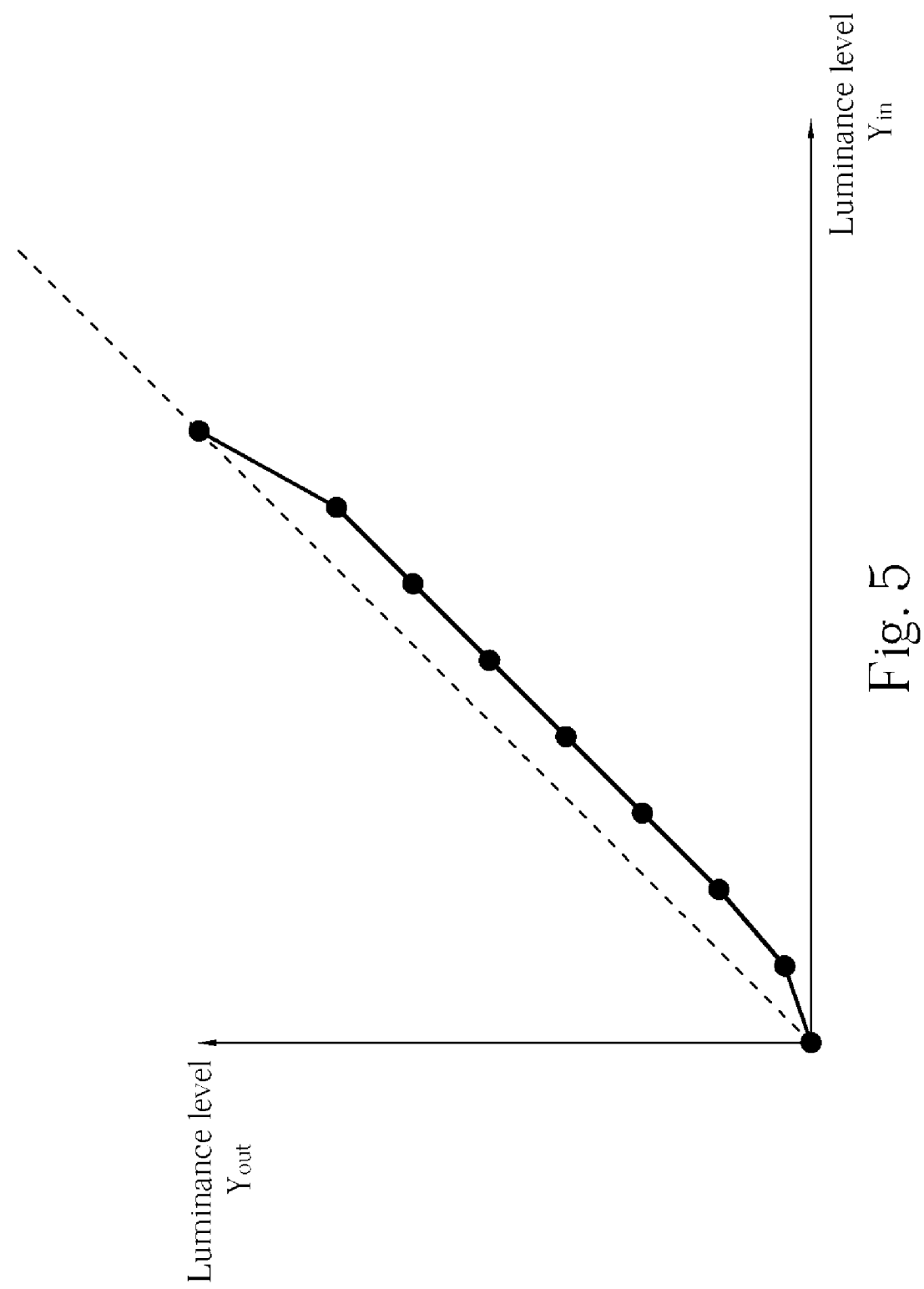
Figure 6:
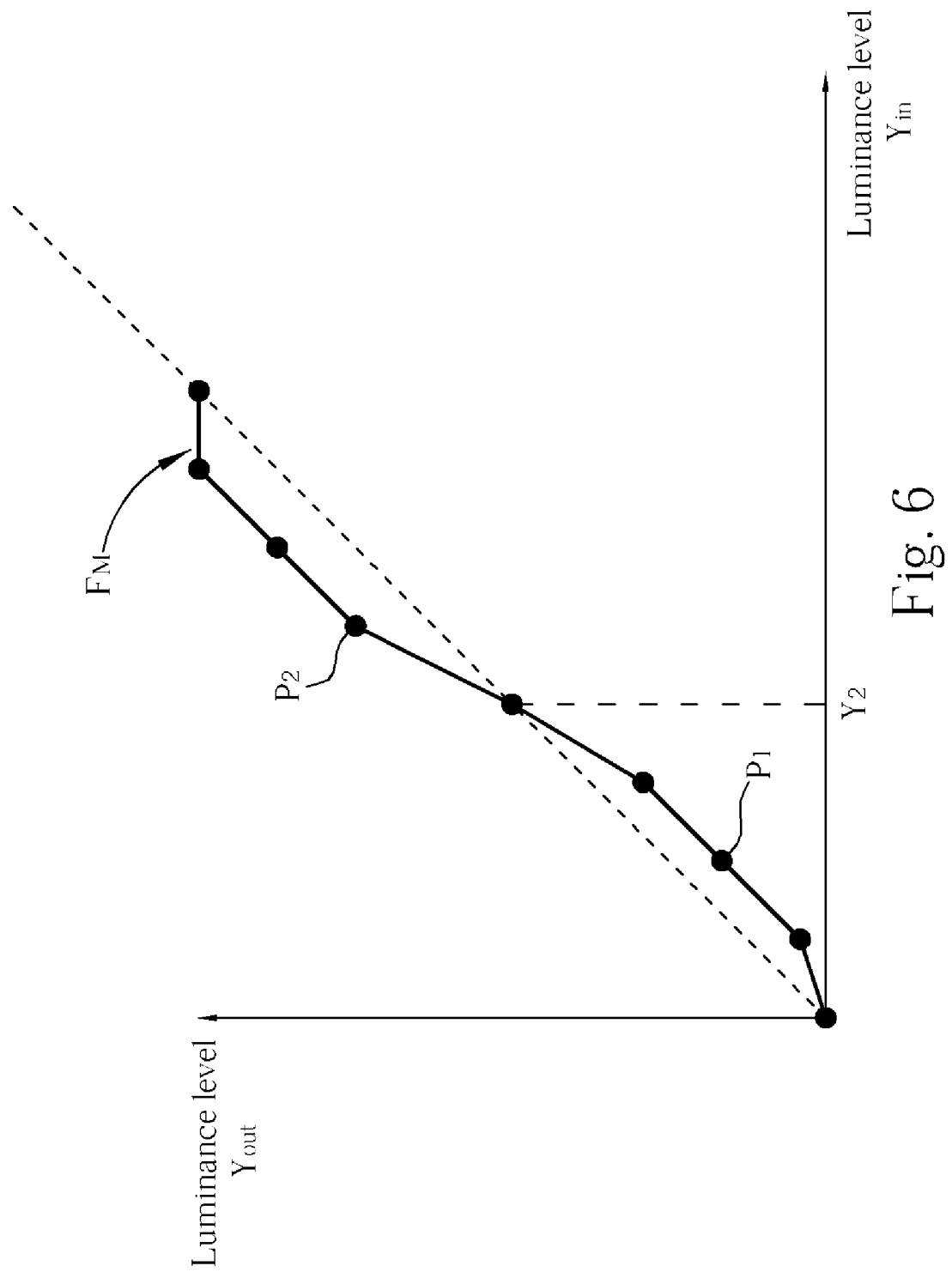

In FIG. 3, a luminance level $Y_{out}$ generated by the dynamic luminance curve fitting unit 42 is equal to a luminance level $Y_{in}$ input to the dynamic luminance curve fitting unit 42. That is, the normal luminance function $F_N$ corresponding to the normal luminance table 34 is linear and has a slope equal to one. In FIG. 4, a luminance level $Y_{out}$ generated by the dynamic luminance curve fitting unit 42 is larger than a luminance level $Y_{in}$ input to the dynamic luminance curve fitting unit 42. That is, the dynamic luminance curve fitting unit 42 increases all of the luminance levels of the pixels of the video 18. In FIG. 5, a luminance level $Y_{out}$ generated by the dynamic luminance curve fitting unit 42 is smaller than a luminance level $Y_{in}$ input to the dynamic luminance curve fitting unit 42. That is, the dynamic luminance curve fitting unit 42 decreases all of the luminance levels of the pixels of the video 18. In FIG. 6, the dynamic luminance curve fitting unit 42 increases luminance levels of a first part of the pixels, $P_2$ for example, of the video 18 and decreases luminance levels of a second part of the pixels, $P_1$ for example, of the video 18 according to the middle luminance function $F_M$. The first part of the pixels each have a luminance level larger than a second predetermined luminance level $Y_2$, while the second part of the pixels each having a luminance level smaller than the second predetermined luminance level $Y_2$. In result, with reference to the middle luminance table 40, the dynamic luminance curve fitting unit 42 darkens the darker part and brightens the brighter part of the video 18 brighter, so that the contrast of the video 18 is improved.

Figure 7:
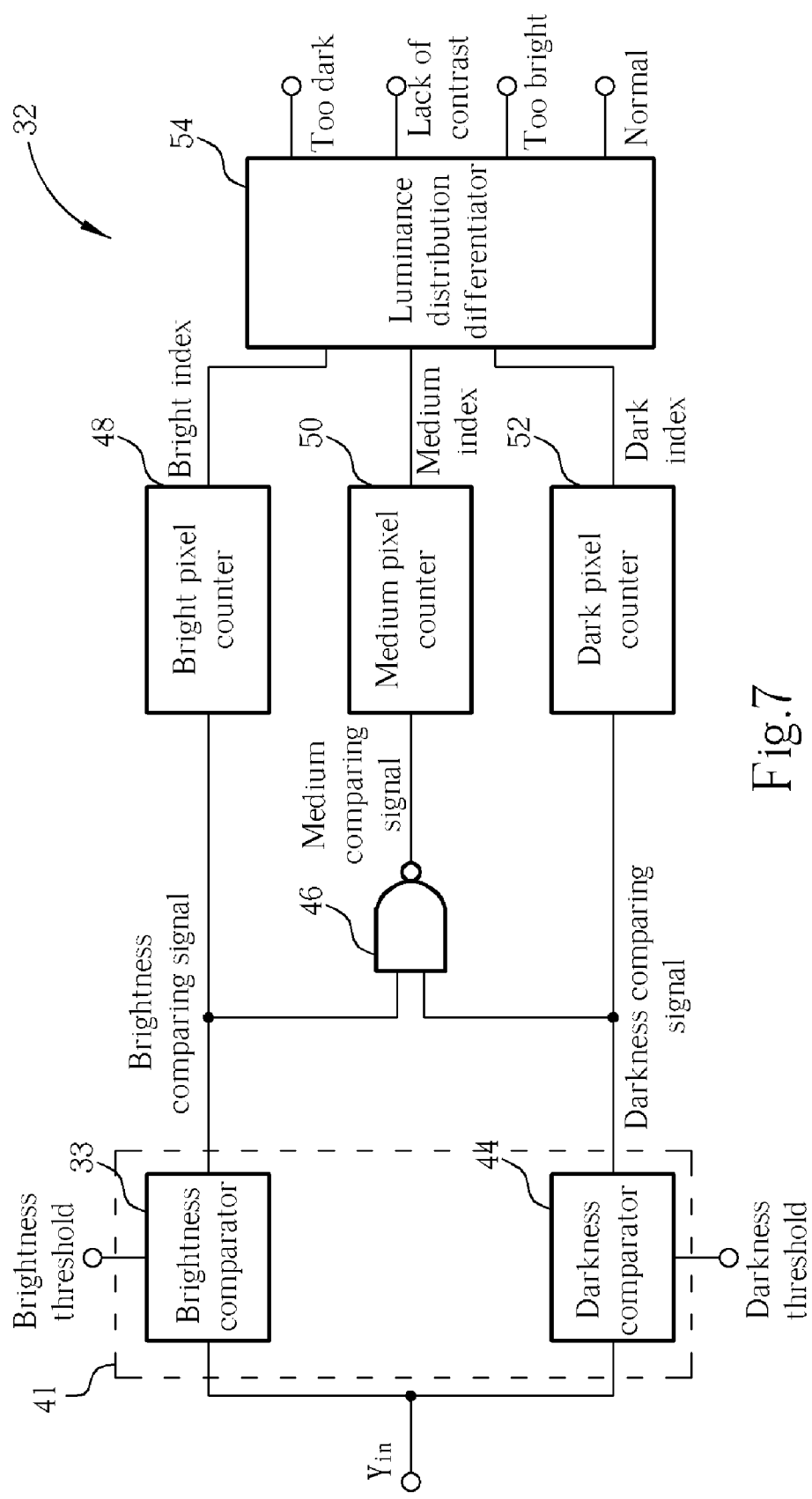
FIG. 7 is a functional block diagram of a luminance analysis unit of the luminance adjustment device shown in FIG. 2.

FIG. 7 is a functional block diagram of the luminance analysis unit 32. The luminance analysis unit comprises a luminance comparing unit 41, a logic unit 46 electrically connected to the luminance comparing unit 41, a bright pixel counter 48 electrically connected a brightness comparator 33, a medium pixel counter 50 electrically connected to the logic unit 46, a dark pixel counter 50 electrically connected to a darkness comparator 44, and a luminance distribution differentiator 54 electrically connected to the bright pixel counter 48, the medium pixel counter 50, and the dark pixel counter 50. The luminance comparing unit 41 comprises the brightness comparator 33 and the darkness comparator 44.

The luminance comparing unit 41 compares the luminance levels $Y_{in}$ of the pixels of the video 18 with a set of luminance thresholds, and to generate a luminance comparing signal. For example, the set of luminance thresholds preferably comprise a brightness threshold $TH_L$ and a darkness threshold $TH_D$. The brightness comparator 33 compares the luminance levels $Y_{in}$ of the pixels of the video 18 with the brightness threshold $TH_L$, in order to generate a brightness comparing signal $CS_L$. The darkness comparator 44 compares the luminance levels $Y_{in}$ of the pixels of the video 18 with the darkness threshold $TH_D$, in order to generate a darkness comparing signal $CS_D$. The logic unit 46 generates a medium comparing signal $CS_M$ according to the darkness comparing signal $CS_D$ and the brightness comparing signal $CS_L$.

In the preferred embodiment, the brightness comparator 33 generates a brightness comparing signal $CS_L$ equal to logic "1" when determining that the luminance level $Y_{in}$ of a pixel of the video 18 is larger than the brightness threshold $TH_L$, and a brightness comparing signal $CS_L$ can be generated as logic "0". The darkness comparator 44 generates a darkness comparing signal $CS_D$ equal to logic "1" when determining that the luminance level $Y_{in}$ of a pixel of the video 18 is smaller than the darkness threshold $TH_D$, and a darkness comparing signal $CS_D$ can be generated as logic "0". In the preferred embodiment, the logic unit 46 is a NAND gate.

Alternatively, the brightness comparator 33 generates a brightness comparing signal $CS_L$ equal to logic "0" instead of logic "1" when determining that the luminance level $Y_{in}$ of a pixel of the video 18 is larger than the brightness threshold $TH_L$, and a brightness comparing signal $CS_L$ can be generated as logic "1". Similarly, the darkness comparator 44 generates a darkness comparing signal $CS_D$ equal to "0" when determining that the luminance level $Y_{in}$ of a pixel of the video 18 is smaller than the darkness threshold $TH_D$, and a darkness comparing signal $CS_D$ can be generated as logic "1". Accordingly, the logic unit 46 is an AND gate.

The bright pixel counter 48 counts a number of pixels for the video 18 having their luminance levels within a bright luminance range $LR_L$ larger than the brightness threshold $TH_L$ according to the brightness comparing signal $CS_L$, and generates a corresponding bright index $CV_L$. The medium pixel counter 50 counts a number of pixels having their luminance levels within a medium luminance range $LR_M$ smaller than the brightness threshold $TH_L$ but larger than the darkness threshold $TH_D$ according to the medium comparing signal $CS_M$, and generates a corresponding medium index $CV_M$. The dark pixel counter 52 counts a number of pixels having their luminance levels within a dark luminance range $LR_D$ smaller than the darkness threshold $TH_D$ according to the darkness comparing signal $CS_D$, and generates a corresponding dark index $CV_D$. The luminance distribution differentiator 54 asserts a luminance comparing signal according to the numbers accumulated by the bright pixel counter 48, the medium pixel counter 50, and the dark pixel counter 52. Preferably, these counters are reset to zero in response to a falling edge of a vertical synchronizing signal Vsync.

Assume the video 18 has 10×12 pixels, 15 of which are determined by the luminance comparing unit 41 to have luminance levels larger than the brightness threshold $TH_L$, 25 of which have luminance levels smaller than the darkness threshold $TH_D$, and the remaining 80 of which have luminance levels between the brightness threshold $TH_L$ and the darkness threshold $TH_D$. Accordingly, the brightness comparator 33 asserts the brightness comparing signal $CS_L$ 15 times, enabling the bright pixel counter 48 to determine that the luminance levels of 15 pixels of the video 18 are within the bright luminance range $LR_L$. The darkness comparator 44 asserts the darkness comparing signal $CS_D$ 25 times, enabling the dark pixel counter 52 to determine that the luminance levels of 25 pixels of the video 18 are within the dark luminance range $LR_D$. The NAND gate 46 generates a medium comparing signal $CS_M$ equal to logic "1" 80 (120−15−25) times, enabling the medium pixel counter 50 to determine that the luminance levels of 80 pixels of the video 18 are within the medium luminance range $LR_M$. Since a majority of pixels of the video 18 have their luminance levels between the darkness threshold $TH_D$ and the brightness threshold $TH_L$, the video 18 is determined to have a lack of contrast.

Figure 8:
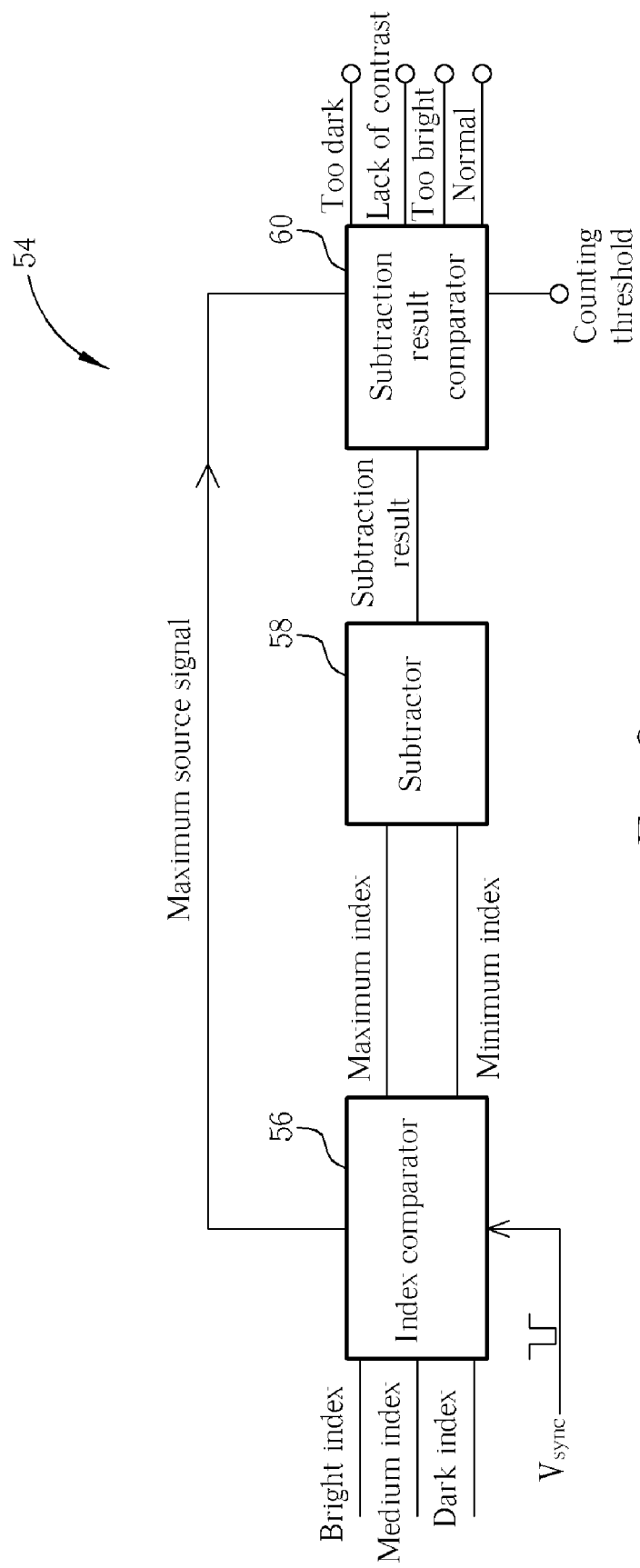
FIG. 8 is a functional block diagram of a luminance distribution differentiator of the luminance adjustment device shown in FIG. 2.

FIG. 8 is a functional block diagram of the luminance distribution differentiator 54. The luminance distribution differentiator 54 comprises an index comparator 56, a subtractor 58 electrically connected to the index comparator 56, and a subtraction result comparator 60 electrically connected to the subtractor 58.

The index comparator 56 compares the bright index $CV_L$, the medium index $CV_M$, and the dark index $CV_D$, in order to determine a maximum index $CV_{MAX}$ and a minimum index $CV_{min}$. According to the scenario described previously, the maximum index $CV_{MAX}$ is equal to "80", and the minimum index $CV_{min}$ is equal to "15". The subtractor 58 subtracts the minimum index $CV_{min}$ from the maximum index $CV_{MAX}$, to generate a subtraction result SB, which is equal to "65" (80−15). The subtraction result comparator 60 compares the subtraction result SB with a counting threshold $TH_{CV}$, and preferably determines if the video 18 is "too dark", "lack of contrast", "too bright", or "normal" according to the subtraction result SB and a maximum source signal where the maximum index $CV_{MAX}$ is originating from. For example, assuming the counting threshold $TH_{CV}$ is equal to "50", the subtraction result comparator 60 compares that the subtraction result SB is larger than the counting threshold $TH_{CV}$, and the luminance distribution differentiator 54 thus determines the video 18 has a "lack of contrast". On the contrary, if the subtraction result SB is smaller than the counting threshold $TH_{CV}$, the luminance distribution differentiator 54 preferably determines the video 18 is "normal", and the luminance adjustment device needs not adjust the luminance levels of the pixels of the video 18.

Since the counting threshold $TH_{CV}$ is equal to "50", which is smaller than the subtraction result SB, and the maximum index $CV_{MAX}$ is derived from the medium pixel counter 50, preferably, the luminance distribution differentiator 54 determines that the video 18 has a "lack of contrast". Accordingly, the dynamic luminance curve fitting unit 42 selects the middle luminance table 40 and adjusts the luminance levels $Y_{in}$ of the pixels of the video 18 based on the middle luminance function $F_M$ as shown in FIG. 6. That is to say, the first part of the pixels of the video 18, which have luminance levels $Y_{in}$ larger than the second predetermined luminance level $Y_2$, are adjusted to have larger luminance levels $Y_{out}$, while the second part of the pixels of the video 18, which have luminance levels $Y_{in}$ smaller than the second predetermined luminance level $Y_2$, are adjusted to have smaller luminance levels $Y_{out}$. Therefore, the video 18 contrast is improved. Preferably, the index comparator 56 signals the subtraction result comparator 60 with the maximum source signal corresponding to the maximum index $CV_{MAX}$.

In the preferred embodiment, any one of the luminance adjustment functions $F_L$, $F_N$, $F_D$ and $F_M$ comprises a finite numbers of input luminance-output luminance pairs, so the luminance adjustment device is designed to estimate luminance levels not shown in the input luminance-output luminance pairs utilizing various kinds of algebra algorithms, such as a linear interpolation, a bilinear interpolation and a B-spline interpolation algorithm.

Figure 9:
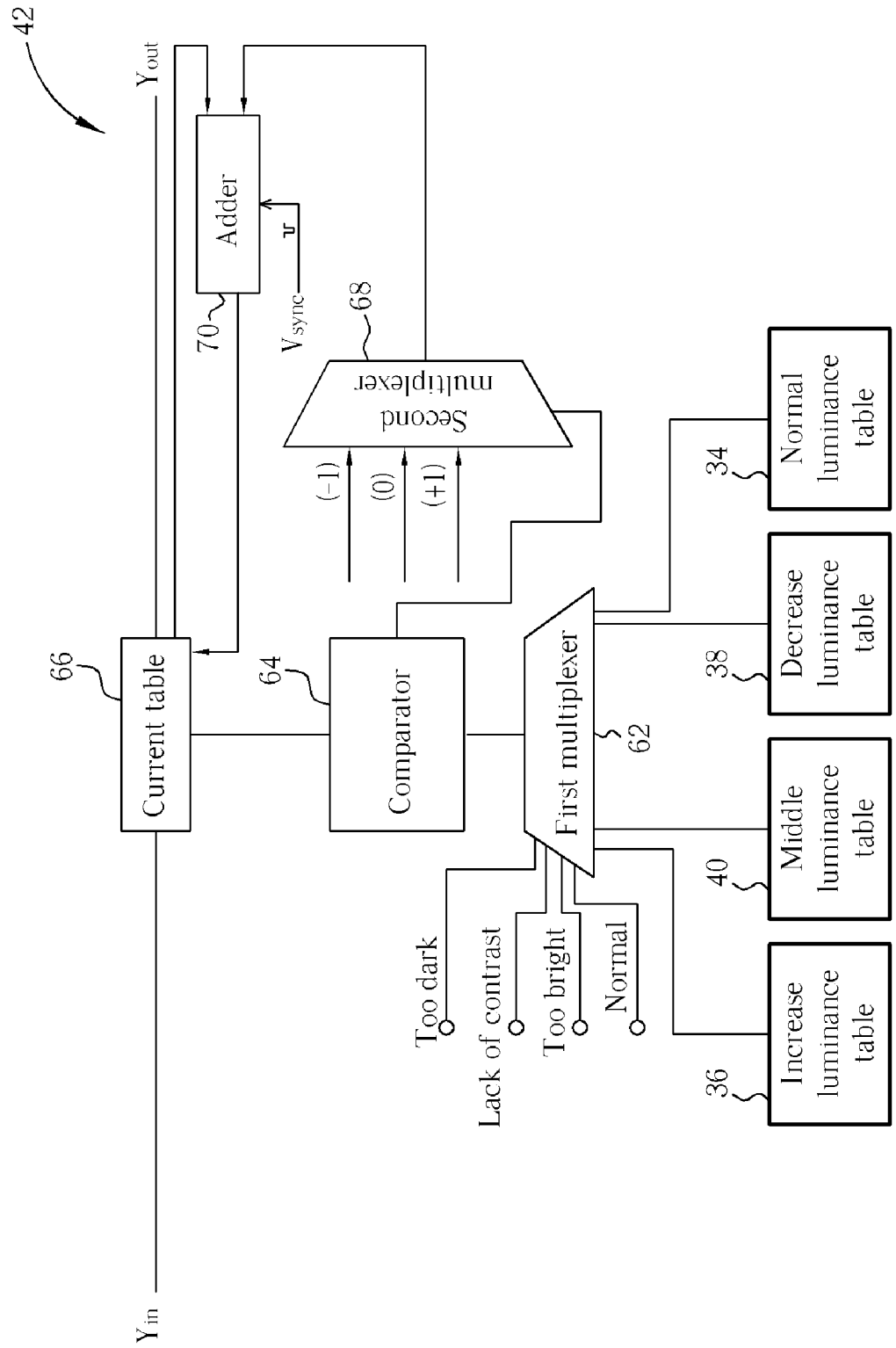
FIG. 9 is a functional block diagram of a dynamic luminance curve fitting unit of the luminance adjustment device shown in FIG. 2.

FIG. 9 is a functional block diagram of the dynamic luminance curve fitting unit 42. The dynamic luminance curve fitting unit 42 properly selects one of the luminance adjustment tables to curve-fit the luminance levels $Y_{in}$ of the pixels of the video 18 according to the luminance distribution determined by the luminance analysis unit 32 by analyzing the luminance levels of the pixels of the video 18. According to the selected luminance adjustment table, the dynamic luminance curve fitting unit 42 curve-fits the video 18. A first multiplexer 62 selects and outputs one of the luminance adjustment tables according to the luminance distribution ("lack of contrast" for example) output by the luminance analysis unit 32. A comparator 64 compares a difference between a current table 66 and the selected table and generates a comparison result to an adder 70, which is equal to "−1", "0", or "+1", preferably, through a second multiplexer 68 controlled by the output of the comparator 64. The adder 70 accumulates the comparison result to the current table 66. The dynamic luminance curve fitting unit 42 thus curve-fits the luminance levels $Y_{in}$ of the pixels of the video 18 according to a luminance adjustment function corresponding to the current table 66. Therefore, the luminance levels $Y_{out}$ of the adjusted pixels of the video 18 is adjusted by the luminance adjustment device adaptively. Preferably, the adder 70 is triggered in response to the vertical synchronizing signal $V_{sync}$. For example, the current table 66 comprises 16 input luminance-output luminance pairs, called mapping points, to map 256 gray levels. Those points not exactly mapped by 16 pairs can be obtained based on an interpolation algorithm. The adder 70 is preferably triggered in response to the vertical synchronizing signal $V_{sync}$, and compares the selected table with the 16 mapping points one by one every time a new video frame begins, so as to update the current table 66 closer to the selected table to adaptively adjust the luminance levels of the pixels of the video 18. Therefore, a suddenly change of the video 18 due to the change of the luminance adjustment tables will not occur. On the other hand, with several hardware mapping points, the adaptively adjustment on video luminance can be realized and the video contrast is improved.

Figure 1:
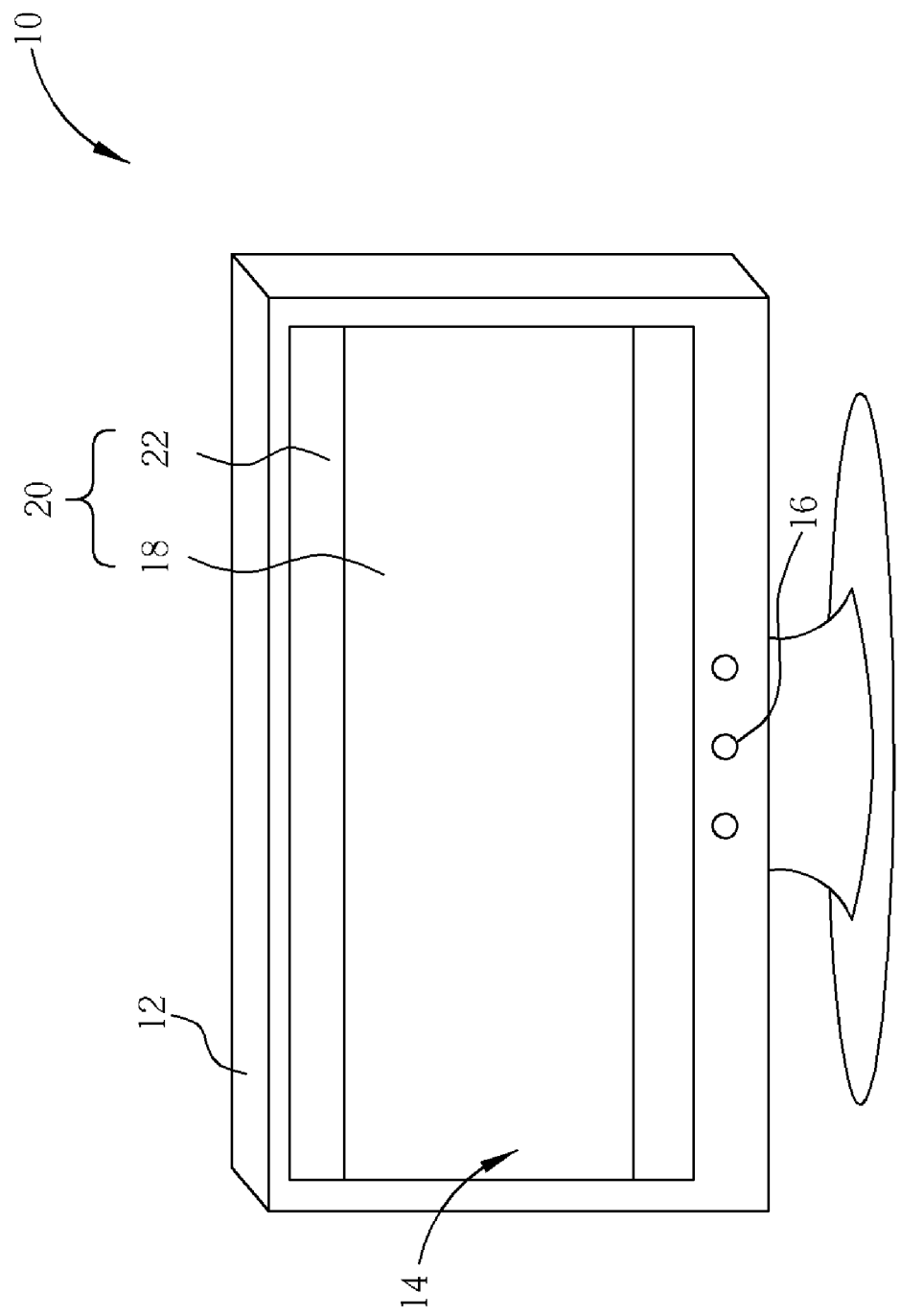
FIG. 1 is a schematic diagram of a video display device according to the prior art.

Please refer to FIG. 1 again. According to the video display device 10 shown in FIG. 1, an original video 20 comprises not only the video 18, but also a black border 22 around the video 18, such as in a widescreen playback mode. The luminance adjustment device is designed to adjust the luminance levels of the pixels of the video 18, instead of adjusting the luminance levels of pixels of the whole original video 20. In order not to count the truncated video 22 and make an erroneous judgment on luminance distribution of the original video 20, the luminance adjustment device is preferably to comprise a video range selector (not shown) electrically connected to the dynamic luminance curve fitting unit 42 and the luminance analysis unit 32 for determining the actual video adjustment range of the original video 20 prior to adjusting the luminance levels of the pixels of the video 18.

Figure 10:
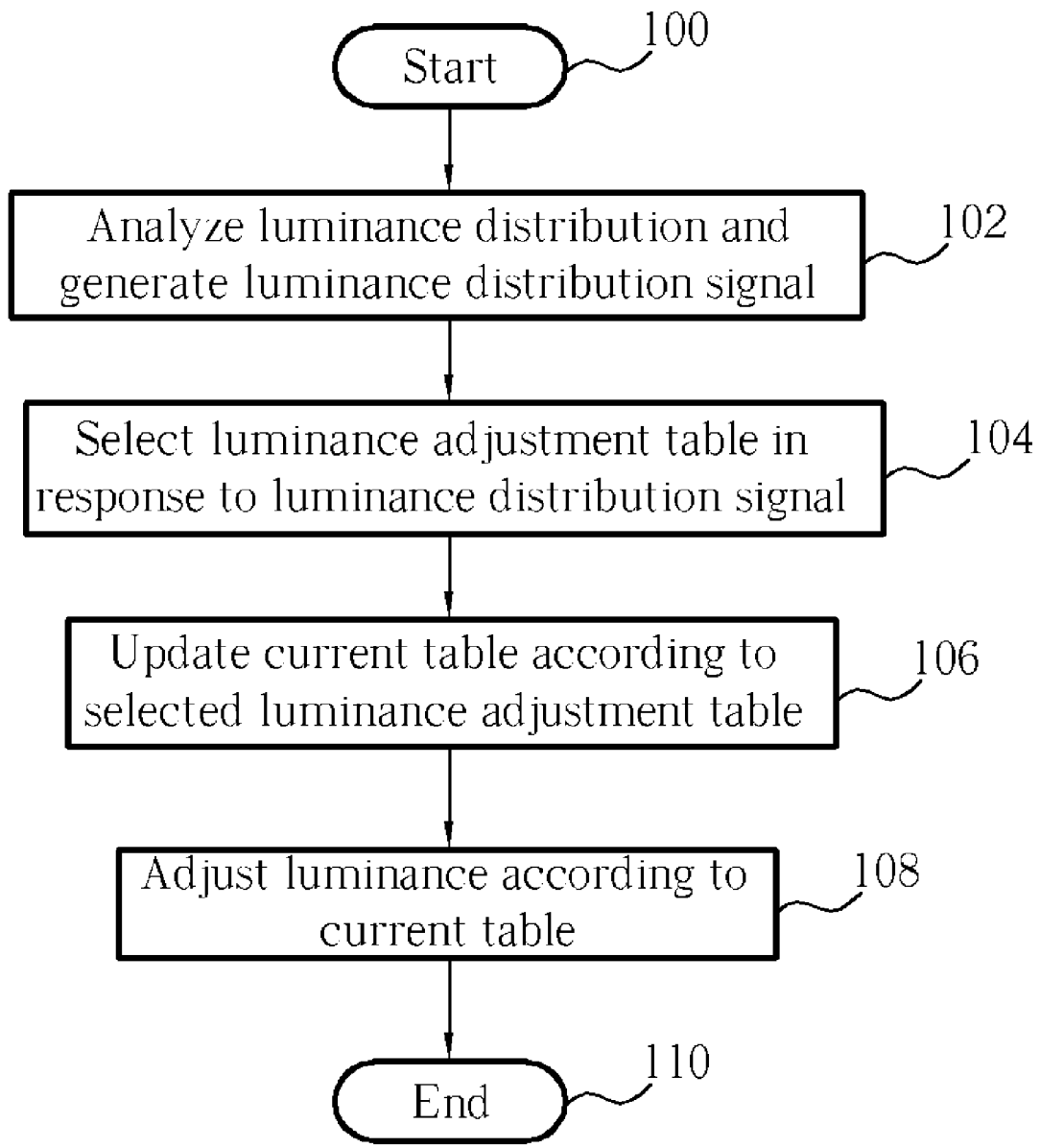
FIG. 10 is a flow chart of a method for adaptively adjusting video luminance according to the preferred embodiment of the present invention.

FIG. 10 is a flow chart of adaptively adjusting video luminance according to the preferred embodiment of the present invention. The flow chart begins in step 100. In step 102, a luminance distribution of a source video is analyzed, so as to generate a luminance distribution signal, for indicating a luminance distribution of "too dark", "too bright", "lack of contrast", or "normal", which can be obtained through a comparison between the luminance levels of the pixels of the source video and a brightness threshold and a darkness threshold. Through a statistical result for bright pixels and dark pixels, the luminance distribution signal is determined. Preferably, the brightness threshold, the darkness threshold can be programmed by a designer. In step 104, an appropriate luminance adjustment table in a luminance adjustment group comprising a plurality of luminance adjustment tables is selected in response to the luminance distribution signal. In step 106, the method adaptively updates a current table with a luminance adjustment table selected in step 104, and adaptively updates a current luminance adjustment function, to avoid a sudden change of a video resulting from the change of the luminance adjustment function. Preferably, the updating process is performed every time the vertical signal Vsync occurs. In step 108, the luminance levels of the pixels of the source video are adjusted according to the current table. In step 110, the method ends.

In summary, the present invention discloses a device for adaptively adjusting luminance of a video. The device includes a plurality of luminance adjustment tables, a luminance analysis unit for analyzing a luminance distribution of a plurality of pixels of a source video, and a dynamic luminance curve fitting unit electrically connected to the luminance analysis unit and the luminance adjustment tables for adjusting luminance levels of the pixels of the source video based on one of the luminance adjustment tables selected according to the luminance distribution. The dynamic luminance curve fitting unit preferably contains a current luminance table. The dynamic luminance curve fitting unit updates the current luminance table according to the selected luminance adjustment table, and adjusts the luminance of the source video based on the updated current luminance table.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device for adaptively adjusting luminance of a source video, the device comprising:
   a plurality of luminance adjustment tables;
   a luminance analysis unit for analyzing a luminance distribution for a plurality of pixels of the source video, wherein the luminance analysis unit comprises:
      a luminance comparing unit for comparing the luminance levels of the pixels of the source video with a set of luminance thresholds, and for generating a luminance comparing signal;
      a plurality of counters electrically connected to the luminance comparing unit for counting a plurality of numbers of pixels within a plurality of luminance ranges defined by the set of luminance thresholds respectively, and for generating a plurality of indexes; and a luminance distribution differentiator electrically connected to the counters for determining the luminance distribution of the pixels of the source video according to the indexes; and a dynamic luminance curve fitting unit electrically connected to the luminance analysis unit and the luminance adjustment tables for adaptively adjusting luminance levels of the pixels of the source video based on one of the luminance adjustment tables selected according to the luminance distribution.

2. The device of claim 1, wherein the luminance adjustment tables comprise a normal luminance table corresponding to a linear function having a slope equal to one.

3. The device of claim 1, wherein the luminance adjustment tables comprise an increase luminance table for increasing all of the luminance levels of the pixels of the source video according to the increase luminance table.

4. The device of claim 1, wherein the luminance adjustment tables comprise a decrease luminance table for decreasing all of the luminance levels of the pixels of the source video according to the decrease luminance table.

5. The device of claim 1, wherein the luminance adjustment tables comprise a middle luminance table for increasing luminance levels of a first part of the pixels of the source video and decreasing luminance levels of a second part of the pixels of the source video according to the middle luminance table, wherein each pixel of the first part of the pixels has a luminance level larger than a predetermined luminance level while each pixel of the second part of the pixels has a luminance level smaller than the predetermined luminance level.

6. The device of claim 1 further comprising a video range adjusting selector electrically connected to the luminance adjustment tables and the luminance analysis unit for determining an actual video range of the source video.

7. The device of claim 1, wherein the dynamic luminance curve fitting unit comprises a current luminance table, the dynamic luminance curve fitting unit updates the current luminance table according to the selected luminance adjustment table, and adjusts the luminance levels of the pixels of the source video according to the updated current luminance table.

8. The device of claim 1, wherein the counters are all set to zero after the luminance distribution differentiator has determined the luminance distribution.

9. The device of claim 1, wherein the counters are all set to zero in response to a falling edge of a vertical synchronizing signal.

10. The device of claim 1, wherein the luminance distribution differentiator comprises:

an index comparator for comparing the indexes and generating a maximum index and a minimum index, both of which are selected from the indexes;

a subtractor electrically connected to the index comparator for subtracting the minimum index from the maximum index, and for generating a subtraction result; and a subtraction result comparator electrically connected to the subtractor for comparing the subtraction result with a count threshold, and for determining the luminance distribution.

11. The device of claim 10, wherein the index comparator generates a maximum source signal to the subtraction result comparator, the maximum source signal associates with the maximum index, and the subtraction result comparator determines the luminance distribution in response to the maximum source signal.

12. The device of claim 11, wherein the luminance distribution comprises a too bright distribution, a too dark distribution, a lack of contrast distribution, and a normal distribution.

13. The device of claim 1, wherein the set of luminance thresholds comprise a brightness threshold and a darkness threshold, the indexes comprise a bright index, a medium index, and a dark index, the luminance comparing signal comprises a darkness comparing signal and a brightness comparing signal, and the luminance comparing unit comprises:

a brightness comparator for comparing the luminance levels of the pixels of the source video with the brightness threshold, and for generating the brightness comparing signal; and a darkness comparator for comparing the luminance levels of the pixels of the source video with the darkness threshold, and for generating the darkness comparing signal.

14. The device of claim 13, wherein the counters comprise:

a bright pixel counter for counting a number of pixels all having their luminance levels within a bright luminance range larger than the brightness threshold according to the brightness comparing signal, and for generating the bright index;

a medium pixel counter for counting a number of pixels all having their luminance levels within a medium luminance range smaller than the brightness threshold but larger than the darkness threshold according to the brightness comparing signal and the darkness comparing signal, and for generating the medium index; and a dark pixel counter for counting a number of pixels all having their luminance levels within a dark luminance range smaller than the darkness threshold according to the darkness comparing signal, and for generating the dark index.

15. The device of claim 1, wherein the selected luminance adjustment table comprises a plurality input luminance-output luminance pairs, and the luminance analysis unit adjusts the luminance levels of the pixels of the source video based on a linear interpolation algorithm.

16. The device of claim 1, wherein the selected luminance adjustment table comprises a plurality input luminance-output luminance pairs, and the luminance analysis unit adjusts the luminance levels of the pixels of the source video based on a B-spline interpolation algorithm.

* * * * *